US008374864B2

(12) United States Patent
Kerr

(10) Patent No.: US 8,374,864 B2
(45) Date of Patent: Feb. 12, 2013

(54) CORRELATION OF TRANSCRIBED TEXT WITH CORRESPONDING AUDIO

(75) Inventor: Jim Kerr, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 177 days.

(21) Appl. No.: 12/661,457

(22) Filed: Mar. 17, 2010

(65) Prior Publication Data

US 2011/0231184 A1 Sep. 22, 2011

(51) Int. Cl.
| G10L 15/06 | (2006.01) |
| G10L 21/00 | (2006.01) |
| G10L 15/26 | (2006.01) |
| G10L 15/04 | (2006.01) |
| G10L 15/00 | (2006.01) |
| G10L 15/16 | (2006.01) |
| G10L 11/00 | (2006.01) |
| G10L 21/06 | (2006.01) |
| H04M 1/64 | (2006.01) |

(52) U.S. Cl. ........ 704/243; 704/201; 704/235; 704/251; 704/253; 704/244; 704/231; 704/232; 704/270; 704/270.1; 704/275; 704/276; 379/88.01; 379/88.08; 379/88.13

(58) Field of Classification Search .................. 704/201, 704/235, 251, 253, 244, 231, 232, 243, 270, 704/270.1, 275, 276; 379/88.01, 88.08, 88.13
See application file for complete search history.

(56) References Cited

U.S. PATENT DOCUMENTS

| 5,568,540 | A  | * | 10/1996 | Greco et al. ............... 379/88.25 |
| 6,035,017 | A  | * | 3/2000  | Fenton et al. .............. 379/88.04 |
| 6,263,308 | B1 | * | 7/2001  | Heckerman et al. .......... 704/231 |
| 6,687,339 | B2 | * | 2/2004  | Martin ....................... 379/88.14 |
| 6,775,360 | B2 | * | 8/2004  | Davidson et al. ........... 379/88.14 |
| 6,850,609 | B1 | * | 2/2005  | Schrage .................... 379/202.01 |
| 7,225,126 | B2 | * | 5/2007  | Hirschberg et al. ........... 704/235 |
| 7,966,181 | B1 | * | 6/2011  | Hirschberg et al. ........... 704/235 |
| 8,064,576 | B2 | * | 11/2011 | Skakkebaek et al. ....... 379/88.13 |
| 2002/0143533 | A1 | * | 10/2002 | Lucas et al. .................. 704/235 |
| 2003/0220784 | A1 | * | 11/2003 | Fellenstein et al. ........... 704/201 |
| 2005/0055213 | A1 | * | 3/2005  | Claudatos et al. ......... 704/270.1 |
| 2006/0085186 | A1 | * | 4/2006  | Ma et al. ....................... 704/240 |
| 2006/0182232 | A1 |   | 8/2006  | Kerr et al. |
| 2007/0081636 | A1 | * | 4/2007  | Shaffer et al. .................... 379/80 |
| 2007/0106508 | A1 | * | 5/2007  | Kahn et al. ..................... 704/235 |
| 2007/0233487 | A1 | * | 10/2007 | Cohen et al. ................... 704/255 |
| 2008/0037716 | A1 | * | 2/2008  | Bran et al. .................... 379/67.1 |
| 2008/0065378 | A1 | * | 3/2008  | Siminoff ....................... 704/235 |
| 2008/0255837 | A1 | * | 10/2008 | Kahn et al. .................... 704/235 |
| 2008/0294433 | A1 | * | 11/2008 | Yeung et al. .................. 704/235 |
| 2008/0319743 | A1 | * | 12/2008 | Faisman et al. ............... 704/235 |
| 2009/0099845 | A1 | * | 4/2009  | George ......................... 704/235 |
| 2010/0145703 | A1 | * | 6/2010  | Park ............................. 704/260 |

OTHER PUBLICATIONS http://www.avid.com/US/solutions/workflow/Scriptbased-Editing.
http://www.spinvox.com/how_it_works.html.

* cited by examiner

Primary Examiner — Edgar Guerra-Erazo
(74) Attorney, Agent, or Firm — Cindy Kaplan

(57) ABSTRACT

In one embodiment, a method includes receiving at a communication device an audio communication and a transcribed text created from the audio communication, and generating a mapping of the transcribed text to the audio communication independent of transcribing the audio. The mapping identifies locations of portions of the text in the audio communication. An apparatus for mapping the text to the audio is also disclosed.

18 Claims, 5 Drawing Sheets

TEXT/AUDIO MAPPING

AUDIO ID = A
TEXT ID = A

| TEXT | AUDIO (offset in ms) |
|---|---|
| Hi | 200 |
| can | 710 |
| you | 1230 |
| meet | 1715 |
| me | 2225 |
| at | 2720 |
| Antarctica | 3210 |

AUDIO ID = B
TEXT ID = B

| TEXT | AUDIO (offset in ms) |
|---|---|
| Please call me at noon | 150 |
| My number is | 1455 |
| xxx-xxxx | 2655 |

Transcription A:

Hi, can you meet me at ?Antarctica?

72

Transcription B:

Please call me at noon. My number is xxx-xxxx.

FIGURE 4

CORRELATION OF TRANSCRIBED TEXT WITH CORRESPONDING AUDIO

BACKGROUND

The present disclosure relates generally to the field of communications, and more particularly, to correlation of transcribed text with corresponding audio.

Transcription services are often used to convert audio communications into text. This may be used, for example, at call centers to document customer service issues, for medical or legal transcription, or for users that do not have the time to listen to voice mail messages and would rather read through the messages.

Speech recognition software may be used to transcribe audio, however, the quality is often not at an acceptable level. Another option is to send an audio file to a transcription service at which a transcriber listens to the audio and provides a transcription. The quality for human transcription is generally better than computer generated transcription. A drawback with human generated transcription is that if the user wants to compare specific text in the transcription with the audio, there is no easy way for the user to identify the location of the text in the audio.

BRIEF DESCRIPTION OF THE DRAWINGS

FIG. 3 is an example of a text to audio mapping generated at the communication device of FIG. 2.

FIG. 4 illustrates the transcribed text for the text to audio mapping of FIG. 3 at a graphical user interface.

DESCRIPTION OF EXAMPLE EMBODIMENTS

Overview

Figure 1:
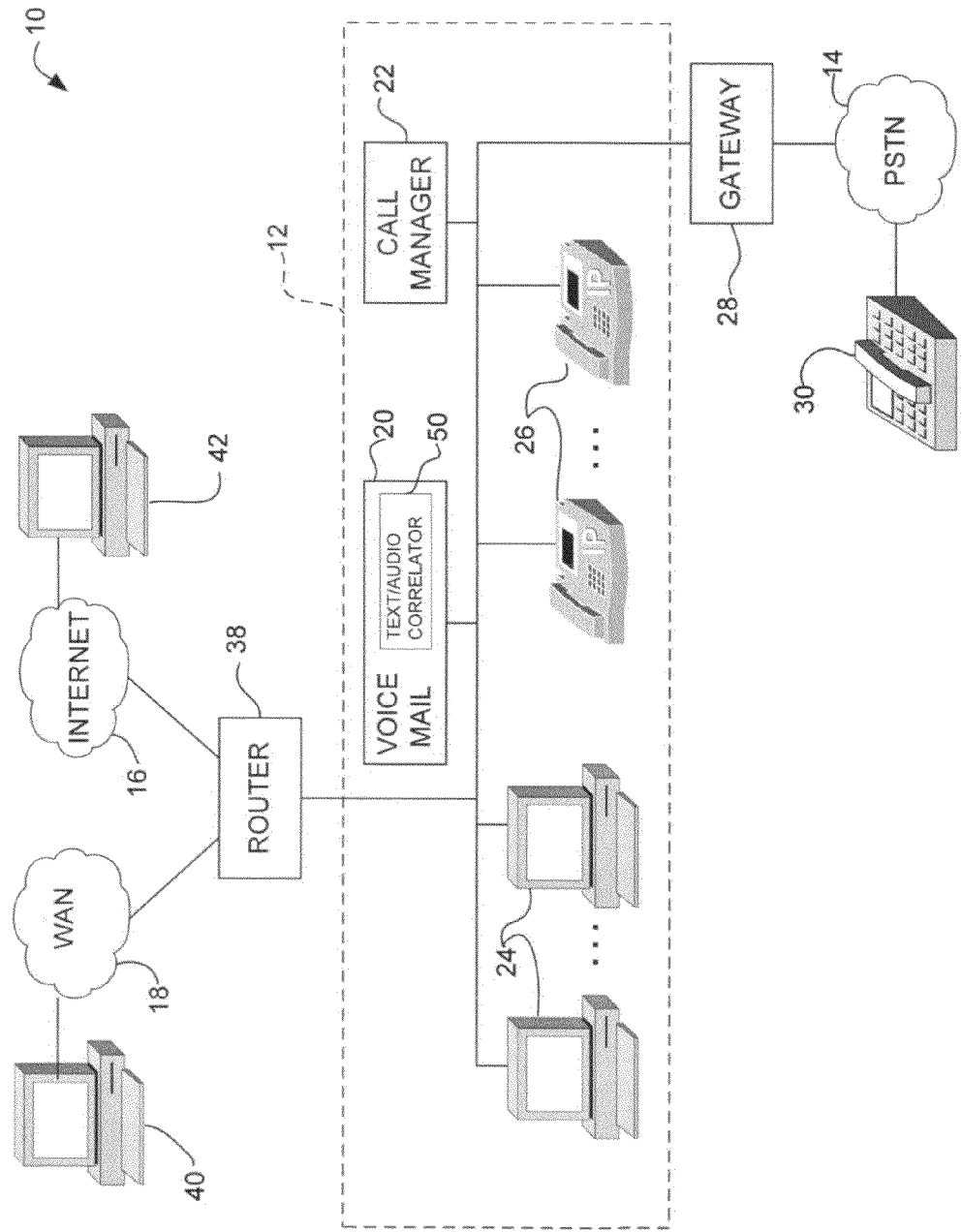
FIG. 1 illustrates an example of a network that may be used to implement embodiments described herein.

In one embodiment, a method generally comprises receiving at a communication device, an audio communication and a transcribed text created from the audio communication, and generating a mapping of the text to the audio communication, independent of transcribing the audio. The mapping identifies locations of portions of the text in the audio communication.

In another embodiment, an apparatus generally comprises memory for storing an audio communication and a transcribed text created from the audio communication, and a processor for generating a mapping of the text to the audio communication independent of transcribing the audio.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Transcription of audio into text is used in a variety of applications, including for example, voice mail, business, legal, and medical. It is usually important that the audio be transcribed accurately. Software currently available to generate text based on audio does not generally provide as accurate transcriptions as human generated transcriptions. However, with conventional human generated transcription there is no way to correlate a word in the transcribed text with its location in the audio file. Thus, if a user is reading the transcribed text and wants to go back and check the audio, there is no easy way to identify the corresponding location in the audio file.

The embodiments described herein map an audio communication to a text transcription created from the audio communication. The mapping breaks down portions of the text (e.g., words, phrases, etc.) and identifies the corresponding locations (e.g., offset times) in the audio. The audio communication may be, for example, a voice mail message, recorded conversation between two or more people, medical description, legal description, or other audio requiring transcription. The transcribed text may be human generated, computer generated, or a combination thereof. In the case of computer generated transcription, the mapping is performed independent of the transcription. The mapping provides a user the ability to easily identify a point in the audio that correlates with a point in the transcribed text. The text to audio mapping may be used, for example, to check the transcribed text, fill in missing portions of the transcribed text, or confirm important information such as phone numbers, dates, or other data.

Referring now to the drawings and first to FIG. 1, a communication network 10 that may be used to implement embodiments described herein is shown. The network 10 includes a plurality of endpoints (user devices) 24, 26, 30, 40, 42 and is operable to establish a communication session between the endpoints. The network 10 shown in FIG. 1 includes a voice mail system 20 and call manager 22 that cooperate to manage incoming calls and other communications among the endpoints. In one embodiment, the call manager 22 may intercept an incoming call or other communication that is directed to an endpoint if that call goes unanswered for a predetermined amount of time or number of rings, for example. The call manager 22 then forwards the incoming call to the voice mail system 20, which operates to record a voice mail message from the incoming caller and store the voice mail message in a database.

In the example shown in FIG. 1, the communication network 10 includes a local area network (LAN) 12, a Public Switched Telephone Network (PSTN) 14, a public network (e.g., Internet) 16, and a wide area network (WAN) 18, which cooperate to provide communication services to the endpoints within the network.

The LAN 12 couples multiple endpoints 24, 26 for the establishment of communication sessions between the endpoints and other endpoints distributed across multiple cities and geographic regions. The LAN 12 is coupled with the Internet 16, WAN 18, and PSTN 14 to allow communication with various devices located outside of the LAN. The LAN 12 provides for the communication of packets, cells, frames, or other portions of information between endpoints, such as computers 24 and telephones 26, which may include an IP (Internet Protocol) telephony device. IP telephony devices provide the capability of encapsulating a user's voice into IP packets so that the voice can be transmitted over the LAN 12 (as wells as the Internet 16 and WAN 18). The LAN 12 may include any combination of network components, including for example, gatekeepers, call managers, routers, hubs, switches, gateways, endpoints, or other network components that allow for exchange of data the network.

Endpoints 24, 26 within the LAN may also communicate with non-IP telephony devices, such as telephone 30 connected to PSTN 14. PSTN 14 includes switching stations, central offices, mobile telephone switching offices, remote terminals, and other related telecommunications equipment. Calls placed to endpoint 30 are made through gateway 28. The gateway 28 converts analog or digital circuit-switched data transmitted by PSTN 14 (or a PBX) to packet data transmitted by the LAN 12 and vice-versa. The gateway 28 also translates between a VoIP (Voice over IP) call control system and a Signaling System 7 (SS7) or other protocols used in the PSTN 14.

Calls may also be made between endpoints 24, 26 in the LAN 12 and other IP telephony devices located in the Internet 16 or WAN 18. A router 38 (or other network device such as a hub or bridge) directs the packets to the IP address of the receiving device.

In the example shown in FIG. 1, the call manager 22 controls IP telephony devices within the LAN 12. In one embodiment, the call manager 22 is an application that controls call processing, routing, telephony device features and options, device configuration, and other telephony functions and parameters within the communications network 10.

The voice mail system 20 operates in connection with the endpoints 24, 26 coupled to the LAN 12 to receive and store voice mail messages for users of endpoints 24, 26, as well as for certain remote devices located outside of the LAN. When a user is participating in a previous call or is otherwise unavailable to take the incoming call, the call may be forwarded to the voice mail system 20. The voice mail system 20 may answer the call and provide an appropriate message to the user requesting that the caller leave a voice mail message. The voice mail system 20 and call manager 22 may be located at separate devices as shown in FIG. 1 or may be located in the same device. The voice mail and call manager applications may also be located in one or more of the endpoints or other network device. In one embodiment, the voice mail system 20 includes a text/audio correlator 50, described in detail below.

It is to be understood that the communication network shown in FIG. 1 is only one example, and the embodiments described herein may be implemented in different networks having any combination of network components. For example, the network may include any combination of network components, gatekeepers, call managers, routers, hubs, switches, gateways, endpoints, or other hardware, software, or embedded logic implementing any number of communication protocols that allow for the exchange of audio, video, or other data using frames or packets in the communication system. The communication network may include any network capable of transmitting audio or video telecommunication signals and data. The networks may be implemented as a local area network, wide area network, global distributed network such as the Internet, or any other form of wireless or wireline communication network.

Figure 2:
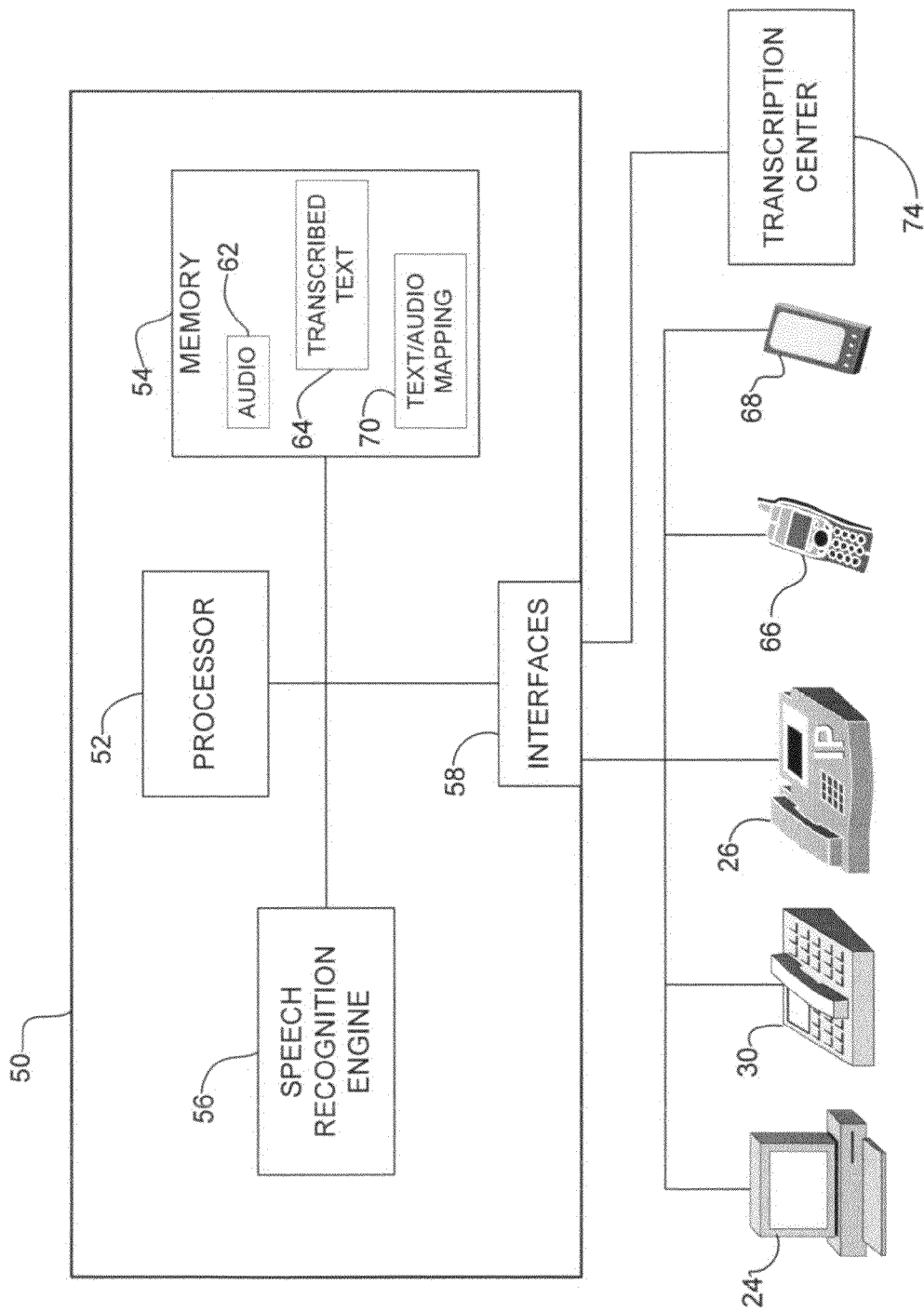
FIG. 2 is a diagram illustrating a communication device for use in the network of FIG. 1, for mapping transcribed text to corresponding audio, in accordance with one embodiment.

FIG. 2 illustrates a communication device (text/audio correlator) 50 for correlating an audio communication with a transcribed text of the communication, in accordance with one embodiment. The device 50 is in communication with a plurality of endpoints, such as the computer 24, telephone 30, or IP telephony device 26 of FIG. 1, or a mobile telephone 66, handheld device 68, or other user device operable to display the transcribed text and play the audio. The communication device 50 may be part of the voice mail system 20, call manager 22, or other device in the network of FIG. 1. The communication device 50 may also be located in one or more of the endpoints.

In one embodiment, the device 50 is in communication with a transcription center 74. The transcription center 74 may be a voice message conversion service that provides human generated transcription, computer generated transcription, or a combination thereof. For example, the transcription services may be provided by a company such as SpinVox, a subsidiary of Nuance Communications of Marlow, UK, for example.

As shown in FIG. 2, the communication device 50 includes a processor 52, memory 54, speech recognition engine 56, and one or more interfaces 58.

The processor 52 may be a microprocessor, controller, or any other suitable computing device. As described below, the processor 52 operates to receive and process voice mail messages intended for end users associated with the endpoints. During the mapping of text to audio, the processor 52 sends information to and receives information from the speech recognition engine 56. The processor 52 also operates to store information in and retrieve information from memory 54. Logic may be encoded in one or more tangible media for execution by the processor 52. For example, the processor 52 may execute codes stored in the memory 54. Program memory is one example of a computer-readable medium. Program memory 54 may be any form of volatile or non-volatile memory including, for example, magnetic media, optical media, random access memory (RAM), read-only memory (ROM), removable media, or any other suitable local or remote memory component.

The speech recognition engine 56 may be any combination of hardware, software, or encoded logic, that operates to receive and process speech signals from the processor 52. Where the received signals are analog signals, the speech recognition engine 56 may include a voice board that provides analog-to-digital conversion of the speech signals. A signal processing module may take the digitized samples and convert them into a series of patterns. The patterns may then be compared to a set of stored modules that have been constructed from the knowledge of acoustics, language, and dictionaries, for example.

The speech recognition engine 56 is configured to match words or phrases in the audio communication to words or phrases contained within the text transcribed from the audio communication. Therefore, the speech recognition engine 56 does not need to be a sophisticated engine operable to convert speech to text. Instead, the engine is only required to match words or phrases within the text to the corresponding words or phrases in the audio. Thus, the speech recognition engine 56 may be a low quality, low overhead speech recognition engine.

In one embodiment, the speech recognition engine 56 uses the audio communication recorded by the voice mail system 20, and the transcribed text received from the transcription center 74. In another embodiment, the communication device 50 (or other network device in communication with the device 50) is configured with a speech recognition engine operable to generate the text transcription of the audio communication. In this case, the speech recognition engine 56 uses the computer generated transcription rather than a transcription from the transcription center 74, for correlation with the audio communication. As previously noted, the text to audio mapping is performed independent from transcribing the text in the case of computer generated transcription. Thus, even if the same speech recognition engine is used for the transcription and the mapping, these steps are performed independent of one another.

In one embodiment, audio communication 62 and transcribed text 64 are stored in memory 54 along with the generated text to audio mapping 70 (FIG. 2). The text to audio mapping 70 includes a list of words or phrases and a corresponding bookmarked offset or tag in the audio communication, as described below with respect to FIG. 3.

The portion of text mapped to the audio may be individual words, numbers, or other data, phrases (e.g., groups of words or numbers, or key phrases (phone numbers, dates, locations, etc.)), or any other identifiable sound or groups of sounds. In one embodiment, the speech recognition engine 56 uses isolated word and phrase recognition to recognize a discrete set of command words, phrases, or patterns or uses key word spotting to pick out key words and phrases from a sentence of extraneous words. For example, the speech recognition engine 56 may use key word spotting to identify strings of numerals, times, or dates and store the offset positions of these key words and phrases in memory.

FIG. 3 illustrates an example of a text/audio mapping 70. Each audio communication is identified with an identifier (e.g., 'A', 'B' as shown in FIG. 3). The text transcribed from the audio communication is identified with a corresponding identifier.

The text to audio mapping for audio A (FIG. 3) is based on the following voice mail message recorded at the communication device 50:

"Hi, can you meet me at Andaluca?"

Upon receiving the voice mail message, the communication device 50 identifies the message with an audio ID A. The audio communication is then transcribed to provide text transcription A (shown in FIG. 4). The transcription may be a human generated transcription received from the transcription center 74, computer generated transcription, or a combination of human and computer generated transcriptions. Upon receipt of the audio A and corresponding text transcription A, the communication device 50 scans the audio looking for matching words or phrases in the text and identifies a location in the audio file for each identified word or phrase.

In one embodiment, the location is an offset position (e.g., time in milliseconds) measured from the beginning of the audio communication. For example, the word 'Hi' in the text A is matched in the corresponding audio at an offset of 200 milliseconds from the beginning of the audio file (FIG. 3). The engine 56 next searches in the audio file for the word 'can'. The speech recognition engine 56 continues to match as many words as practical from the audio to words in the text file and lists the offset times from the beginning of the audio file. The speech recognition engine 56 may skip over words such as 'a' and 'the' and focus on more easily distinguished words or key phrases.

The transcribed text is presented to the user at a graphical user interface (GUI) at the user device, with embedded links at tagged words or phrases. FIG. 4 illustrates a screen 72 displaying the transcribed text at the user device. As shown in FIG. 4, the transcriber may insert an indicator (e.g., '?') to identify a word that was not understood by the transcriber. In the example of transcription A, the transcriber incorrectly transcribed 'Andaluca' as 'Antarctica'. Mapped words or phrases in the text are highlighted (or otherwise identified) so that the user can select any of the individual words or phrases by placing a pointer (using, for example, a mouse, wheel, or other tracking device) over the word or phrase and clicking on the selected text. Once the mapped portion of text is selected, the user device retrieves the audio and begins to play the audio at the location corresponding to the selected text. Padding may be added to the offset location in the audio so that the audio begins to play slightly before the mapped location.

Referring again to FIG. 4, when a user opens the message for transcription A, the user may realize that 'Antarctica' is probably not the correct word. The user can select the highlighted word 'Antarctica' and the text/audio mapping is used to go to the relevant point in the audio at the specified offset. The user then listens to the audio which plays the word 'Andaluca'.

In the example shown in FIG. 4 for transcription B, the speech recognition engine 56 only identifies offsets for phrases (e.g., 'Please call me at noon') or numbers (e.g., phone number 'xxx-xxxx').

In one embodiment, the text/audio mapping 70 is stored in memory 54 along with the recorded audio communication 62 and transcribed text 64 (FIG. 3). This data may be stored in a queue with other voice mail messages and associated mappings received for an end user. The message and related data may remain in memory 54 until the processor 52 receives a command from the end user that requests the retrieval of any stored messages. Upon receiving such a command, the processor 52 may retrieve the audio 62, text, 64, and mapping for the message from memory 54. The processor 52 then transmits the data to the endpoint associated with the recipient of the message. The communication device 50 may also be configured so that it transmits only the transcribed text 64 upon request for messages from the user and then transmits the audio 62 and mapping 70 only if requested by the user.

As previously noted, the endpoint may also be configured to correlate the audio and text and generate the text/audio mapping 70. In this embodiment, the voice mail system 20 may store the audio communication 62 and corresponding text 64, and upon receiving a request from the user, transmit both the audio and text to the user. The speech recognition engine at the user device then uses the audio and text files 62, 64 to generate the mapping 70.

Figure 5:
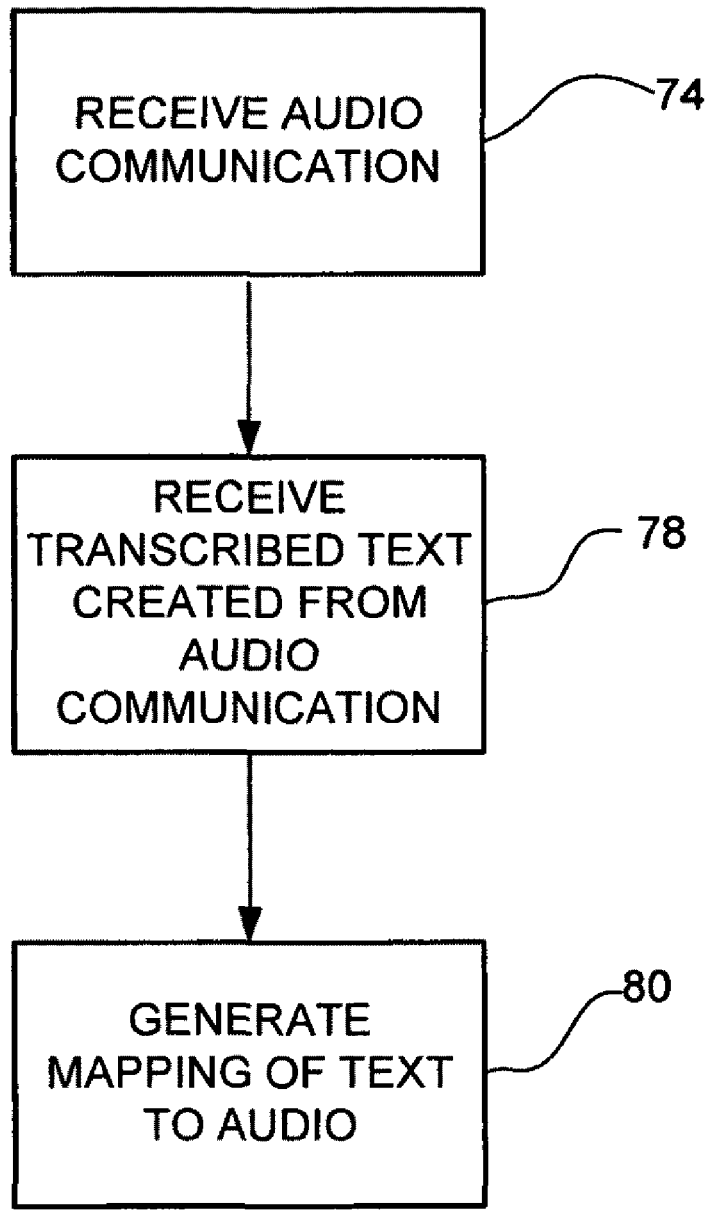
FIG. 5 is a flowchart illustrating an overview of a process for mapping transcribed text to corresponding audio, in accordance with one embodiment.

FIG. 5 is a flowchart illustrating an overview of a process for mapping transcribed text to its corresponding audio. At step 74, an audio communication is received at the communication device 50. As described above, the communication device may be a voice mail system, endpoint, or other network device. The audio communication is used to create a transcribed text, which is also received at the communication device 50 (step 78). In one embodiment, the communication device 50 transmits the audio communication to the transcription center 74, which returns the transcribed text of the audio to the communication device 50. The transcribed text may also be generated at the communication device 50, in which case the text is received from a speech recognition engine at the device. The communication device 50 then generates a mapping of the transcribed text to the audio communication (step 80). The mapping identifies locations of portions of the text in the audio communication. The mapping is performed independent of transcribing the audio.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:

receiving at a communication device, an audio file comprising an audio communication;

receiving at the communication device, a text file comprising a transcribed text created from the audio communication; and generating at the communication device, a mapping of the text file comprising the transcribed text to the audio file comprising the audio communication, independent of transcribing the audio communication, said mapping identifying locations of portions of the transcribed text in the audio communication wherein generating said mapping comprises processing the audio file at a speech recognition engine to match words in the text file to sounds in the audio file.

2. The method of claim 1 wherein the audio communication comprises a voice mail message.

3. The method of claim 1 wherein the transcribed text comprises a human generated transcription.

4. The method of claim 1 wherein the communication device comprises a voice mail system.

5. The method of claim 1 wherein the communication device comprises a user device operable to display the transcribed text and play the audio communication.

6. The method of claim 1 further comprising transmitting the audio communication to a transcription center and wherein receiving the transcribed text comprises receiving the text from the transcription center.

7. The method of claim 1 wherein said portions of the text comprise words or phrases and said locations comprise time offsets from a start of the audio communication.

8. The method of claim 1 further comprising inserting links in the transcribed text to said locations in the audio communication based on said mapping.

9. An apparatus comprising:

memory for storing an audio file comprising an audio communication and a text file comprising a transcribed text created from the audio communication; and a processor for generating a mapping of the text file comprising the transcribed text to the audio file comprising the audio communication independent of transcribing the audio communication, said mapping identifying locations of portions of the text in the audio communication; and a speech recognition engine, wherein generating said mapping comprises processing the audio file at the speech recognition engine to match words in the text file to sounds in the audio file.

10. The apparatus of claim 9 wherein the audio communication comprises a voice mail message.

11. The apparatus of claim 9 wherein the transcribed text comprises a human generated transcription.

12. The apparatus of claim 9 wherein the apparatus comprises a voice mail system.

13. The apparatus of claim 9 wherein the apparatus comprises a user device operable to display the transcribed text and play the audio communication.

14. The apparatus of claim 9 wherein the processor is configured to transmit the audio communication to a transcription center and receive the transcribed text from the transcription center.

15. The apparatus of claim 9 wherein said portions of the text comprise words or phrases and said locations comprise time offsets from a start of the audio communication.

16. The apparatus of claim 9 wherein the processor is further operable to insert links in the transcribed text to said locations in the audio communication based on said mapping.

17. Logic encoded in one or more non-transitory media for execution and when executed operable to:

receive an audio file comprising an audio communication;

receive a text file comprising a transcribed text created from the audio communication; and generate a mapping of the text file comprising the transcribed text to the audio file comprising the audio communication independent of transcribing the audio communication, said mapping identifying locations of portions of the text in the audio communication;

wherein generating said mapping comprises processing the audio file to match words in the text file to sounds in the audio file.

18. The logic of claim 17 wherein the logic is operable to insert links in the transcribed text to said locations in the audio communication based on said mapping.

* * * * *